July 30, 1963    L. WAGENSEIL    3,099,157
FUEL SUPPLY CONTROL FOR ENGINE COMPRESSORS
Filed Dec. 24, 1957    2 Sheets-Sheet 1
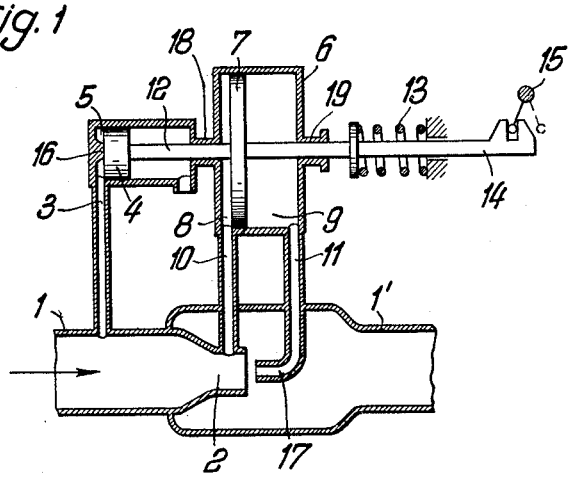
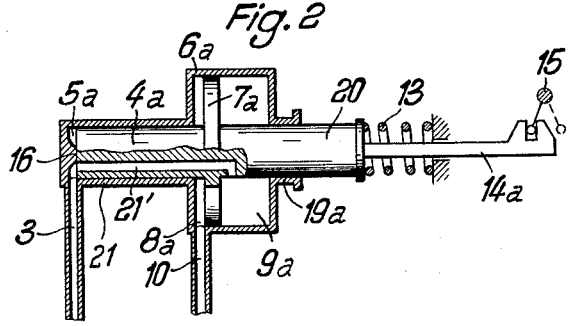
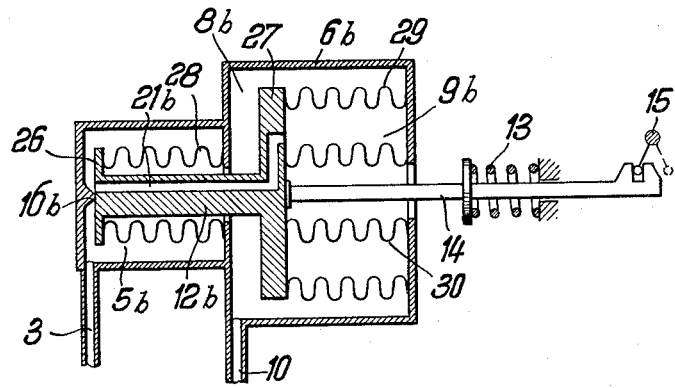
Inventor:
Ludwig Wagenseil
by: Michael S. Striker
Attorney July 30, 1963 — L. WAGENSEIL — 3,099,157
FUEL SUPPLY CONTROL FOR ENGINE COMPRESSORS
Filed Dec. 24, 1957 — 2 Sheets-Sheet 2
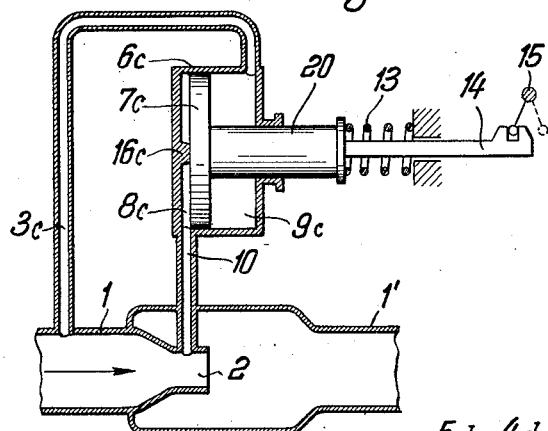
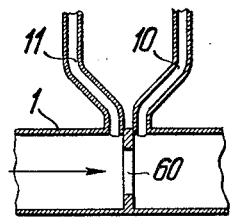
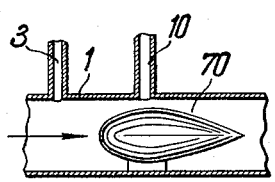
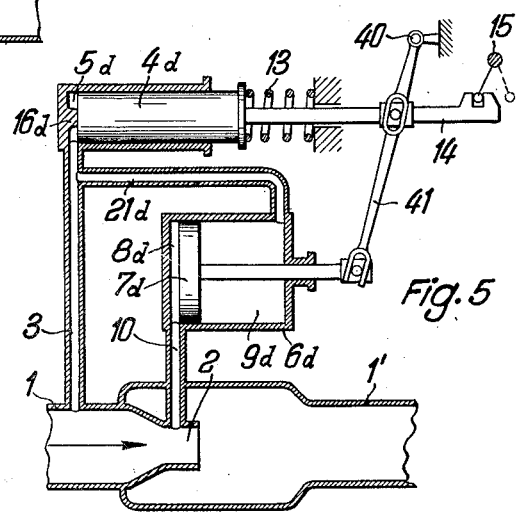
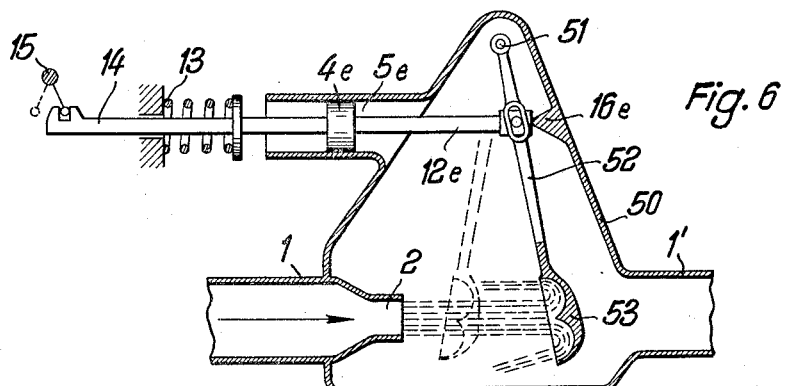
Inventor:
Ludwig Wagenseil
by Michael S. Striker
Attorney

United States Patent Office 3,099,157
Patented July 30, 1963

3,099,157
FUEL SUPPLY CONTROL FOR ENGINE
COMPRESSORS
Ludwig Wagenseil, Munich-Allach, Germany, assignor to Junkers Maschinen- und Metallbau G.m.b.H., Munich-Allach, Germany
Filed Dec. 24, 1957, Ser. No. 705,002
Claims priority, application Germany Dec. 24, 1956
14 Claims. (Cl. 73—213)

The present invention relates to devices for controlling the supply of fuel to an engine.

More particularly, the present invention relates to devices for controlling the supply of fuel to an engine-compressor, and in particular to a free piston type of engine compressor.

One of the objects of the present invention is to control the fuel supply according to variations in the difference between a pair of opposed forces in a manner which does not require that the pressure of the compressed gas at zero delivery, during idling of the engine compressor, be greater than the pressure of the gas during delivery at full load.

Another object of the present invention is to control the supply of fuel to the engine compressor in accordance with the difference between a pair of opposed forces the larger of which is determined by the static pressure of a stream of compressed gas and the smaller of which is determined by the rate of delivery of the compressed gas.

A further object of the present invention is to provide a structure capable of utilizing relatively small forces to control the fuel supply.

An additional object of the present invention is to provide a fuel-supply controlling structure which operates with very small flow losses.

It is also an object of the present invention to provide structure capable of accomplishing the above objects, being flexible enough to lend itself without difficulty to many different types of executions, and composed of simple ruggedly constructed elements which operate reliably.

With the above objects in view the present invention includes, in a device for automatically controlling the supply of fuel to a compressor such as a free-piston engine compressor, a conduit along which the compressed gas flows during delivery thereof, this conduit having a reduced portion of lesser cross section than other portions of the conduit so that gas flowing through the reduced conduit portion has a greater dynamic and a lesser static pressure than the gas in other portions of the conduit. Also, the structure of the invention includes a shiftable pressure-responsive assembly. In accordance with the present invention a means is provided for supporting the latter assembly for shifting movement in a fuel supply increasing direction and in an opposite fuel supply decreasing direction, and this means communicates with the above-mentioned conduit and applies to the pressure-responsive assembly a static pressure of the gas in the conduit urging the assembly in the fuel supply decreasing direction and the dynamic pressure of the gas which flows through the reduced conduit portion for urging the assembly in the fuel supply increasing direction, so that the pressure-responsive assembly shifts according to the difference between the static and dynamic pressures applied to the assembly by the above means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary, diagrammatic, sectional illustration of one possible embodiment of a fuel supply controlling structure according to the present invention;

FIG. 2 shows a variation of the structure of FIG. 1;

FIG. 3 shows a different embodiment of a pressure-responsive assembly used in the organization of the present invention;

FIG. 4 shows a further embodiment of a fuel supply controlling arrangement of the present invention;

FIG. 5 diagrammatically illustrates a still further embodiment using a lever system for magnifying a force;

FIG. 6 shows an embodiment using a lever system actuated by impingement of a jet on a bucket;

FIG. 7 illustrates a different embodiment of a conduit portion of reduced cross section capable of being used in the organization of the present invention; and FIG. 8 shows a still further embodiment of a conduit portion of reduced cross sectional area.

Referring first to FIG. 1, it will be seen that the device of the present invention includes a conduit 1 along which the compressed gas flows in the direction of the arrow shown in FIG. 1. This conduit directs the compressed gas to a desired location from, for example, a free-piston engine compressor of the type shown, for example, in German Patent 939,963 of March 8, 1956. The present invention solves the same problem which is solved in this German patent, but this solution provided by the present invention is different and superior to that provided by the German patent. Copending U.S. patent application Serial Number 541,501, filed October 19, 1955, now Patent No. 2,914,239, corresponds to this German patent.

The conduit 1 is provided with a portion 2 of reduced cross section, as compared to other portions of the conduit, and the reduced conduit portion 2 is in the form of a simple nozzle through which the gas flows with greater dynamic and lesser static pressure than in the portion of the conduit upstream of reduced portion 2. The reduced conduit portion 2 is located within portion 1' of the conduit.

The structure further includes a shiftable pressure-responsive means 4, 12, 7 in the form of the piston 4 of relatively small diameter, the piston 7 of a diameter substantially larger than the piston 4, and the bar 12 interconnecting these pistons and coaxial therewith.

A means is provided to support this pressure-responsive means for shifting movement to the right, as viewed in FIG. 1, in a fuel supply decreasing direction and to the left, as viewed in FIG. 1, in a fuel supply increasing direction, and this means includes a cylinder means in the form of a pair of coaxial cylinders in which pistons are respectively slidable. These cylinders are interconnected by a suitable sutffing box 18 through which the bar 12 slides in a fluid-tight manner. The means which supports the pressure-responsive assembly 4, 12, 7 for axial shifting movement additionally cooperates with the conduit 1, 2, 1' for applying static ressure from the gas in the conduit to the shiftable assembly to urge the latter in the fuel supply decreasing direction and for applying pressure from the reduced conduit portion 2 to the pressure-responsive assembly for urging the latter to shift to the left, as viewed in FIG. 1, in the fuel supply increasing direction. Thus, the pressure-responsive assembly shifts in accordance with variations in the pressure differential in the gas in the two conduit portions.

An axial extension 14 of the bar 12 extends to the right, as viewed in FIG. 1, from the piston 7, through stuffing box 19 of cylinder 6 in which piston 7 slides, and through a suitable bearing into engagement with a lever which transmits the axial movement of the pressure-responsive assembly to a fuel supply controlling member 15 so as to change the angular position of the latter according to changes in the axial position of the assembly 4, 12, 7, 14. The turning of member 15 varies the fuel supply in a known way, so that as the pressure-responsive assembly shifts the supply of fuel to the engine compressor will be automatically controlled. The lever connected to the rotary member 15 has a crank portion extending into a notch of bar 14, and when the latter shifts to the right, as viewed in FIG. 1, the member 15 is turned in a counterclockwise direction to decrease the fuel supply, while when bar 14 shifts axially in the opposite direction the member 15 turns clockwise, as viewed in FIG. 1, to increase the fuel supply.

The bearing which supports the bar 14 for shifting movement is engaged by one end of a coil spring 13 whose opposite end abuts against a fixed collar and the spring 13 is coiled about this bar to urge the pressure-responsive assembly to the left, as viewed in FIG. 1. As was pointed out above, the force of the static pressure urging the assembly to the right, as viewed in FIG. 1, is greater than the force of the dynamic pressure urging the assembly to the left, and the spring 13 counterbalances the force differential so that the pressure-responsive assembly will be located in different axial positions corresponding to the force differential, and the extent to which the spring 13 is compressed corresponds at any particular instant to the force differential at the same instant.

In the embodiment of FIG. 1, the static pressure applied to the pressure-responsive assembly is derived from a portion of the conduit 1 upstream of the reduced portion 2 thereof through the conduit 3 which maintains the chamber 5 at the letf end face of piston 4 at this static pressure. The opposite face of the piston 4 communicates with the outer atmosphere through an opening at the right end of the cylinder in which piston 4 slides. A boss 16 at the inner surface of the left end wall of this cylinder limits movement of the pressure-responsive assembly in the fuel supply increasing direction, and the assembly is shown in the latter end position in FIG. 1 where the compressor operates at full delivery.

The chamber 8 of cylinder 6 at the left of piston 7, as viewed in FIG. 1, is maintained through conduit 10 at the static pressure of the gas flowing through the reduced conduit portion 2, and the chamber 9 at the right of piston 7 is maintained through conduit 11 at the total (static and dynamic) pressure of the gas in the reduced conduit portion 2, the end 17 of conduit 11 being directed toward the jet issuing from nozzle 2 for this purpose.

It is apparent that the difference between the forces acting on the opposite faces of the piston 7 will be equal to the force of the dynamic pressure of the gas in reduced conduit portion 2 acting on the right face of piston 7 to urge the latter to the left, as viewed in FIG. 1, while the force of the static pressure in chamber 5 urges the assembly to the right. As the dynamic pressure increases, the force differential decreases and the pressure-responsive assembly automatically shifts to the left to increase fuel supply. On the other hand, as the dynamic pressure decreases the force differential increases and the assembly shifts to the right to decrease the fuel supply. Inasmuch as the speed of gas flow increases to increase the dynamic pressure during an increase in the rate of gas delivery and decreases to decrease the dynamic pressure during a decrease in the rate of gas delivery, the fuel supply is increased and decreased as the rate of gas delivery increases and decreases, respectively.

Inasmuch as the total pressure in reduced conduit portion 2, transferred to chamber 9 through conduit 11, is equal to the static pressure of the gas transferred to chamber 5 by conduit 3, instead of the conduit 11 a branch of conduit 3 may communicate with chamber 9, and such a structure is shown in other embodiments of the invention described below.

The embodiment of FIG. 2 includes conduits 3 and 10 communicating with conduit 1, 2, 1' in the same way as in FIG. 1, and the conduit 11, 17 is omitted from the embodiment of FIG. 2. Those elements of FIG. 2 which are identical with those of FIG. 1 are indicated with the same reference characters while elements of FIG. 2 corresponding to those of FIG. 1 are indicated with the same reference characters followed by the letter $a$. It will be noted that the piston $4a$ is elongated and slides in a cylinder 21 connected directly with the cylinder $6a$. An extension 20 of piston $4a$ is connected to the bar $14a$ and slides through the stuffing box $19a$. The extension 20 of piston $4a$ communicates at its right end, as viewed in FIG. 2, with the outer atmosphere. A passage 21' extends from chamber 5 through piston $4a$ and part of extension 20 into communication with chamber $9a$ so that the latter is maintained at the total pressure in the reduced conduit portion 2 which is the same as the static pressure of conduit 1 transmitted to chamber 5 in the conduit 3. It is apparent that the embodiment of FIG. 2 will produce the same results as the embodiment of FIG. 1 but is simpler in that only two communicating conduits (3 and 10) are required while the stuffing box 18 is eliminated.

In the embodiment of FIG. 3 the shiftable pressure-responsive means is formed by an assembly of bellows rather than pistons. The elements of FIG. 3 identical with those of FIG. 1 are indicated by the same reference characters while those elements of FIG. 3 which correspond to elements of FIG. 1 by operating in an analogous fashion are indicated with the same reference characters followed by the letter $b$. The conduits 3 and 10 of FIG. 3 cooperate with the conduit 1, 2, 1' in the same way as in FIG. 1. The bellows 28 replaces the piston 4 and is located in the chamber $5b$ maintained through conduit 3 at the static pressure in conduit 1, and the end plate 26 of the bellows 28 cooperates with boss $16b$ to limit movement of the assembly to the left, the interior of the bellows 28 communicating through an opening in the left wall of cylinder $6b$ with the chamber $8b$ maintained through conduit 10 at the static pressure of reduced conduit portion 2.

The bellows 29 in cylinder $6b$ replaces piston 7 and includes an end plate 27 connected through bar $12b$ with bellows 26, 28. The bar $12b$ is formed with passage $21b$ which maintains the chamber $9b$ at the same pressure as chamber $5b$, and the interior of bellows 29 forms the chamber $9b$. This chamber is limited by a bellows 30 whose interior communicates with the outer atmosphere so as to provide the equivalent of communication of piston 20 of FIG. 2 with the outer atmosphere or communication of piston 4 of FIG. 1 with the outer atmosphere. It will be noted that with the arrangement of FIG. 3 axial shifting of the pressure-responsive assembly to the right will produce simultaneous shortening of all bellows, so that the structure of FIG. 3 will have a long life. It is apparent that the embodiment of FIG. 3 will produce the same results as the embodiments of FIGS. 1 and 2 without the use of pistons.

The embodiment of FIG. 4 shows a further simplification of the structure of FIG. 2, and the elements of FIG. 4 identical with those of FIG. 2 have the same reference characters while those which operate analogously to the elements of FIG. 2 have the same reference characters followed by the letter $c$. In this embodiment the piston $4a$ and the cylinder in which it slides are eliminated, and the left wall of cylinder $6c$ is closed and is provided with the boss $16c$ which limits movement of the pressure-responsive assembly $7c$, 20, 14 to the left. The conduit $3c$ communicates directly with the chamber $9c$. Otherwise, the structure of FIG. 4 is the same as that of FIG. 2. With the embodiment of FIG. 4 the right face of piston $7c$ has a smaller area than the left face thereof, the difference being equal to the cross sectional area of piston 20. The larger left face of the piston $7c$ communicates with the chamber $8c$ which is maintained through conduit 10 at the static pressure of the reduced conduit portion 2. An area of the left face of piston $7c$ equal to the area of the right face thereof is acted on by a pressure less than that which acts on the right face by the dynamic pressure of the gas in reduced conduit portion 2, so that with the embodiment of FIG. 4 this dynamic pressure still urges the pressure-responsive assembly to the left. The remainder of the area of the left face of piston 7c, equal to the cross sectional area of piston 20, is urged to the right by the static pressure of reduced conduit portion 2, so that the embodiment of FIG. 4 also operates according to the difference between forces determined by the static and dynamic pressures of the gas. With this embodiment, the latter force differential is again smallest at the full delivery position shown in FIG. 4 and highest at zero delivery (during idling), so that the embodiment of FIG. 4 operates in the same way as the other embodiments. With the embodiment of FIG. 4 not only does the dynamic pressure which urges the pressure-responsive assembly to the left increase and decrease as the rate of gas delivery increases and decreases, respectively, but in addition the static pressure urging the pressure-responsive assembly to the right decreases as the rate of delivery increases and increases as the rate of delivery decreases, so that the control of the fuel supply is influenced by variations in static pressure as well as dynamic pressure. The same results can be obtained with the embodiment of FIGS. 1–3 by connecting the chamber 5 (5b of FIG. 3) of these embodiments with conduit 10 whilst in the chamber 9 (9b in the case of FIG. 3) remains the full static pressure.

When operating with low gas velocities and therefore correspondingly small dynamic pressures, the effective areas of the pistons 7, 7c and bellows 29 are made relatively large so as to be several times the effective area of pistons 4, 4a and bellows 28, and some cases require an undesirably large diameter of the pistons 7 or elements corresponding thereto. This disadvantage may be avoided according to a further feature of the present invention by disconnecting pistons 4 and 7, or the elements corresponding thereto, from each other and applying the dynamic pressure to the piston 7 through a lever system which magnifies the force derived from a small dynamic pressure. Such an embodiment is shown in FIG. 5 where elements identical with FIG. 1 have the same reference characters and elements analogous to those of FIG. 1 have the same reference characters followed by the letter d. Thus, as may be seen from FIG. 5 the pistons 4d and 7d are separate from each other and slide in separate cylinders, the cylinder 6d communicating through conduit 21d with conduit 3 to maintain the chamber 9d at the total pressure in reduced conduit portion 2. The piston rod of piston 7d is connected at its exterior right end, as viewed in FIG. 5, through a pin and slot connection or the like to one end of a lever 41 connected by a pin and slot connection with the rod or bar 14, and the lever 41 is supported for turning movement by a stationary pivot 40. Thus, the dynamic pressure which acts to displace piston 7d to the left acts through lever 41 on piston 4d to urge the latter to the left, so that even if this dynamic pressure is quite small it can nevertheless be effective without requiring a piston 7d and cylinder 6d of undesirably large diameter. Of course, the stroke of piston 7d is correspondingly longer. Other power amplifying means, such as gear or hydraulic transmissions, may be used instead of a lever system.

In the embodiment of FIG. 6 the piston 7 is eliminated. Instead of using the dynamic pressure, the jet of gas issuing from nozzle 2 is used directly for urging the pressure-responsive assembly to shift in the fuel supply increasing direction which is to the right, as viewed in FIG. 6. The conduit of FIG. 6 includes portions 1 and 2 as described above, but instead of portion 1', the conduit of FIG. 6 includes an enlarged conduit portion forming a housing 50, and in the housing 50 is located a stationary pivot 51 which turnably supports a downwardly extending lever 52 carrying a Pelton bucket 53 at its bottom end directed toward the nozzle 2 so that the jet issuing therefrom engages the bucket and is deflected thereby through approximately 180° so that the jet force acting on the bucket is approximately twice as great as it would be if the jet impinged on a flat surface. The chamber 5e communicates directly with the interior of housing 50 so as to be at the static pressure of the gas downstream of the reduced conduit portion 2, and the piston 4e is slidable along the cylindrical extension of housing 50 which forms the chamber 5e at the right of piston 4e. The bar 12e forms together with piston 4e and extension 14 the pressure-responsive shiftable assembly, and the movement of this assembly to the right full delivery position is determined by boss 16e. The lever 52 is connected with the bar 12e through a pin and slot connection, and elements 13–15 of FIG. 6 act in the same way as these elements in the other embodiment. The jet force acting on bucket 53 is multiplied by the lever before being applied to the piston 4e in opposition to static pressure acting thereon, so that the embodiment of FIG. 6 operates to produce the same results as the other embodiments, namely, to control the fuel supply in accordance with the differential between a pair of opposed forces one of which is determined by the static pressure of the gas in the conduit and the other of which is determined by the dynamic pressure of the gas in the reduced conduit portion.

With the present invention, as illustrated in the above-described embodiments, the desired result of regulation of the fuel supply without a considerable increase of the final compression pressure with decreasing delivery is obtainable with a relatively small dynamic pressure because with such a small pressure the necessary force can be exerted with a large enough piston area or through a suitable lever system. To produce such a relatively low dynamic pressure, the reduction in the cross sectional area of the conduit need not be too pronounced since a relatively small increase in the velocity of the compressed gas is sufficient. Therefore, the energy losses are also maintained low as compared, for example, with a venturi. The simple nozzle 2 of the above described embodiments provides the necessary increase in gas velocity without producing considerable energy losses.

Instead of a nozzle 2, an apertured disc may be used to produce the conduit portion of lesser cross sectional area, and FIG. 7 shows the conduit 1 provided with a disc formed with the central opening 60 of lesser diameter than the remainder of the conduit. The conduits 11 and 10 communicate with the conduit 1 of FIG. 7 upstream and downstream of the disc adajacent to the latter, and the conduits 11 and 10 cooperate with the structure of FIG. 2, for example, in the manner illustrated therein.

In the embodiment of FIG. 8 the reduced conduit portion is obtained by inserting into the conduit 1 in spaced relation to the wall thereof a streamlined body 70 for increasing the gas velocity and forming an annular nozzle. The conduit 3 gives the static pressure upstream of the body 70, while the static pressure at the minimum nozzle cross section is derived through the conduit 10, in the same way as the above-described embodiments of the invention. Of course, if desired, a suitable venturi may be used for increasing the gas velocity.

It will be understood that each of the elements described above, or two or more together, may also find a useful application in other types of fuel regulators differing from the types described above.

While the invention has been illustrated and described as embodied in pressure-responsive fuel regulators, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An automatic controlling device of the character described comprising, in combination, a conduit through which compressed gas flows during delivery thereof, said conduit having a reduced portion of lesser cross-section than other portions of said conduit so that the gas flowing through said reduced conduit portion has greater dynamic and lesser static pressure than the gas in other portions of said conduit, said dynamic pressure in said reduced conduit portion increasing and said static pressure decreasing when the rate of delivery of gas through said conduit increases and vice versa; a support; control means mounted on said support for reciprocating movement and having at least a pair of acting faces facing in opposite direction and extending in a direction transverse to the direction of movement of said control means, the total area of one of said acting faces being considerably larger than the total area of the other of said acting faces; means for applying only the static pressure from said reduced portion of lesser cross-section of said conduit to one of said acting faces and the static pressure from one of the other portions of said conduit to the other of said acting faces so that said control means tends to move under the difference of forces acting on said acting faces thereof in one direction, whereby a substantial force difference is obtained with a minimum of static pressure difference in said reduced and said other portions of said conduit so that the reduction of the cross-section in said conduit can be held to a minimum thus avoiding increased flow losses of the gas passing through said reduced cross-section, said control means responding only to the differential between said static pressures; spring means operatively connected to said control means and tending to move the same in a direction opposite to said one direction; and motion transmitting means connecting said control means to a controlling member for moving the latter.

2. An automatic controlling device of the character described comprising, in combination, a conduit through which compressed gas flows during delivery thereof, said conduit having a reduced portion of lesser cross-section than other portions of said conduit so that the gas flowing through said reduced conduit portion has greater dynamic and lesser static pressure than the gas in other portions of said conduit, said dynamic pressure in said reduced conduit portion increasing and said static pressure decreasing when the rate of delivery of gas through said conduit increases and vice versa; piston means having at least a pair of acting faces facing in opposite direction, one of said acting faces having a relatively small diameter and the other of said acting faces having a relatively large diameter greater than the diameter of said one acting face; cylinder means supporting said piston means for reciprocating movement; conduit means communicating with said cylinder means for applying to said acting face of larger diameter of said piston means only the static pressure from said reduced portion of said conduit and to said acting face of smaller diameter of said piston means the total static pressure from one of the other portions of said conduit so that said piston means tends to move under the difference of forces acting on said acting faces thereof in one direction, whereby a substantial force difference is obtained with a minimum of static pressure difference in said reduced and said other portions of said conduit so that the reduction of the cross-section in said conduit can be held to a minimum thus avoiding increased flow losses of the gas passing through said reduced cross-section, said piston means responding only to the differential between said static pressures; spring means operatively connected to said piston means and tending to move the same in a direction opposite to said one direction; and motion transmitting means connecting said piston means to a controlling member for moving the latter.

3. A servo motor arrangement responsive to the static pressure and the rate of delivery of a gas flowing through a conduit comprising, in combination, a conduit along which gas flows during delivery thereof, said conduit having a reduced portion of lesser cross section than other portions of said conduit so that the gas flowing through said conduit portion of lesser cross section has a greater dynamic and a smaller static pressure than the gas in other portions of said conduit, said dynamic pressure in said reduced conduit portion increasing and the static pressure decreasing when the rate of delivery of gas through said conduit increases and vice versa; shiftable means having at least two acting faces one of which having a larger cross section than the other; means mounting said shiftable means movable in opposite directions and communicating with said conduit at said portion of reduced cross section and another portion thereof for directing gas from said conduit portion of reduced cross section to said acting face of larger cross section to apply the static pressure from said portion of reduced cross section of said conduit to said acting face of larger cross section and for directing gas from another portion of said conduit to said acting face of smaller cross section to apply the static pressure from said other portion of said conduit to said acting face of smaller cross section so that the shiftable means is moved in one direction when the rate of delivery of gas in said conduit decreases, said shiftable means responding only to the differential between said static pressures; and spring means operatively connected to said shiftable means and tending to move the same in a direction opposite to said one direction.

4. A servo motor arrangement responsive to the static pressure and the rate of delivery of a gas flowing through a conduit comprising, in combination, a conduit along which gas flows during delivery thereof, said conduit having a reduced portion of lesser cross section than other portions of said conduit so that the gas flowing through said conduit portion of lesser cross section has a greater dynamic and a smaller static pressure than the gas in other portions of said conduit, said dynamic pressure in said reduced conduit portion increasing and the static pressure decreasing when the rate of delivery of gas through said conduit increases and vice versa; piston means having at least two acting faces one of which having a larger cross section than the other; cylinder means mounting said piston means movable in opposite directions; first conduit means communicating with said conduit at said portion of reduced cross section for directing gas from said conduit portion of reduced cross section to said acting face of larger cross section to apply the static pressure from said portion of reduced cross section of said conduit to said acting face of larger cross section; second conduit means communicating with another portion of said conduit for directing gas from said other portion of said conduit to said acting face of smaller cross section to apply the static pressure from said other portion of said conduit to said acting face of smaller cross section so that the piston means is moved in one direction when the rate of delivery of gas in said conduit decreases, said shiftable means responding only to the differential between said static pressures; and spring means operatively connected to said piston means and tending to move the same in a direction opposite to said one direction.

5. A servo motor arrangement responsive to the static pressure and the rate of delivery of a gas flowing through a conduit comprising, in combination, a conduit along which gas flows during delivery thereof, said conduit having a reduced portion of lesser cross section than other portions of said conduit so that the gas flowing through said conduit portion of lesser cross section has a greater dynamic and a smaller static pressure than the gas in other portions of said conduit, said dynamic pressure in said reduced conduit portion increasing and the static pressure decreasing when the rate of delivery of gas through said conduit increases and vice versa; a pair of pistons, one of said pistons having a larger cross section than the other; a pair of cylinders respectively mounting said pistons for reciprocating movement therein; connecting means connecting said pistons for simultaneous movement; first conduit means communicating with said conduit at said portion of reduced cross section thereof for directing gas from said reduced cross section into the cylinder housing the piston of larger cross section; second conduit means communicating with another portion of said conduit for directing gas from said other portion into the cylinder housing the piston of smaller cross section so that said pistons are moved in one direction when the rate of delivery of gas in said conduit decreases; and spring means operatively connected to said pistons and tending to move the same in a direction opposite to said one direction.

6. A servo motor arrangement responsive to the static pressure and the rate of delivery of a gas flowing through a conduit comprising, in combination, a conduit along which gas flows during delivery thereof; said conduit having a reduced portion of lesser cross section than other portions of said conduit so that the gas flowing through said conduit portion of lesser cross section has a greater dynamic and a smaller static pressure than the gas in other portions of said conduit, said dynamic pressure in said reduced conduit portion increasing and the static pressure decreasing when the rate of delivery of gas through said conduit increases and vice versa; a pair of pistons, one of said pistons having a larger cross section than the other; a pair of cylinders respectively mounting said pistons for reciprocating movement therein; connecting means connecting said pistons for simultaneous movement; first conduit means communicating with said conduit at said portion of reduced cross section thereof for directing gas from said reduced cross section to one face of said piston of larger cross section; second conduit means communicating with another portion of said conduit for directing gas from said other portion into the cylinder housing the piston of smaller cross sections; third conduit means for directing gas emanating from the conduit portion of smaller cross section to the other face of said piston of larger cross section so that said pistons are moved in one direction when the rate of delivery of gas in said conduit decreases; and spring means operatively connected to said pistons and tending to move the same in a direction opposite to said one direction.

7. A servo motor arrangement responsive to the static pressure and the rate of delivery of a gas flowing through a conduit comprising, in combination, a conduit along which gas flows during delivery thereof, said conduit having a reduced portion of lesser cross section than other portions of said conduit so that the gas flowing through said conduit portion of lesser cross section has a greater dynamic and a smaller static pressure than the gas in other portions of said conduit, said dynamic pressure in said reduced conduit portion increasing and the static pressure decreasing when the rate of delivery of gas through said conduit increases and vice versa; a pair of pistons, one of said pistons having a larger cross section than the other; a pair of cylinders respectively mounting said pistons for reciprocating movement therein; first conduit means communicating with said conduit at said portion of reduced cross section thereof for directing gas from said reduced cross section into the cylinder housing the piston of larger cross section; second conduit means communicating with another portion of said conduit for directing gas from said other portion into the cylinder housing the piston of smaller cross section so that said pistons are moved in one direction when the rate of delivery of gas in said conduit decreases; connecting means connecting said pistons for simultaneous movement, said connecting means including a lever operatively connected to said piston of larger cross section for multiplying the force obtained from the action of the gas thereon; and spring means operatively connected to said pistons and tending to move the same in a direction opposite to said one direction.

8. An automatic controlling device of the character described comprising, in combination, a conduit through which compressed gas flows during delivery thereof, said conduit having a reduced portion of lesser cross section than other portions of said conduit so that the gas flowing through said reduced conduit portion has greater dynamic and lesser static pressure than the gas in other portions of said conduit, said dynamic pressure in said reduced conduit portion increasing and said static pressure decreasing when the rate of delivery of gas through said conduit increases and vice versa; a support; control means mounted on said support for reciprocating movement and having at least a pair of acting faces facing in opposite direction and extending in a direction transverse to the direction of movement of said control means; means for applying only the static pressure from said reduced portion of lesser cross section of said conduit to one of said acting faces and the static pressure from one of the other portions of said conduit to the other of said acting faces so that said control means tends to move under the difference of forces acting on said acting faces in one direction, said control means responding only to the differential between said static pressures; spring means operatively connected to said control means and tending to move the same in a direction opposite to said one direction; and motion transmitting means connecting said control means to a controlling member for moving the latter.

9. An automatic controlling device of the character described comprising, in combination, a conduit through which compressed gas flows during delivery thereof, said conduit having a reduced portion of lesser cross section than other portions of said conduit so that the gas flowing through said reduced conduit portion has greater dynamic and lesser static pressure than the gas in other portions of said conduit, said dynamic pressure in said reduced conduit portion increasing and said static pressure decreasing when the rate of delivery of gas through said conduit increases and vice versa; a support; piston means having at least a pair of acting faces facing in opposite direction; cylinder means supporting said piston means for reciprocating movement; conduit means communicating with said cylinder means for applying only the static pressure from said reduced portion of lesser cross section of said conduit to one of said acting faces and the static pressure from one of the other portions of said conduit to the other of said acting faces so that said piston means tends to move under the difference of forces acting on said acting faces in one direction, said piston means responding only to the differential between said static pressures; spring means operatively connected to said piston means and tending to move the same in a direction opposite to said one direction; and motion transmitting means connecting said piston means to a controlling member for moving the latter.

10. An automatic controlling device of the character described comprising, in combination, a conduit through which compressed gas flows during delivery thereof, said conduit having a reduced portion of lesser cross section than other portions of said conduit so that the gas flowing through said reduced conduit portion has greater dynamic and lesser static pressure than the gas in other portions of said conduit, said dynamic pressure in said reduced conduit portion increasing and said static pressure decreasing when the rate of delivery of gas through said conduit increases and vice versa; a support; control means mounted on said support for reciprocating movement and including a plate having a pair of acting faces facing in opposite direction and extending in a direction transverse to the direction of movement of said control means, and bellow means closed at one end thereof by one of said acting faces of said plate and fixed at the other end thereof to said support; means for applying only the static pressure from said reduced portion of lesser cross section of said conduit to one of said acting faces and the static pressure from one of the other portions of said conduit to the other of said acting faces so that said control means tends to move under the difference of forces acting on said acting faces in one direction, said control means responding only to the differential between said static pressures; spring means operatively connected to said control means and tending to move the same in a direction opposite to said one direction; and motion transmitting means connecting said control means to a controlling member for moving the latter.

11. An automatic controlling device of the character described comprising, in combination, a conduit through which compressed gas flows during delivery thereof, said conduit having a reduced portion of lesser cross section than other portions of said conduit so that the gas flowing through said reduced conduit portion has greater dynamic and lesser static pressure than the gas in other portions of said conduit, said dynamic pressure in said reduced conduit portion increasing and said static pressure decreasing when the rate of delivery of gas through said conduit increases and vice versa; a support; control means mounted on said support for reciprocating movement and including a pair of control members connected to each other for simultaneous movement in the same direction and having each a pair of acting faces facing in opposite direction and extending in a direction transverse to the direction of movement of said control means; means for applying only the static pressure from said reduced portion of lesser cross section of said conduit to one face of one control member and the static pressure from one of the other portions of said conduit to the opposite face of said one control member and to the one face of the other control member facing in the same direction as said one face of said one control member, the other face of said other control member being subjected to atmospheric pressure, so that said control members tend to move under the difference of forces acting on said faces in one direction, said control means responding only to the differential between said static pressures; spring means operatively connected to said control means and tending to move the same in a direction opposite to said one direction; and motion transmitting means connecting said control means to a controlling member for moving the latter.

12. An arrangement as defined in claim 11 in which said acting faces of said control members have different areas.

13. An arrangement as defined in claim 11 and including passage means formed through said control members and extending from said one face of said other control member to said opposite face of said one control member.

14. An automatic controlling device of the character described comprising, in combination, a conduit through which compressed gas flows during delivery thereof, said conduit having a reduced portion of lesser cross section than other portions of said conduit so that the gas flowing through said reduced conduit portion has greater dynamic and lesser static pressure than the gas in other portions of said conduit, said dynamic pressure in said reduced conduit portion increasing and said static pressure decreasing when the rate of delivery of gas through said conduit increases and vice versa; a support; piston means including a pair of pistons of different diameter fixedly connected together with one end face of the small diameter piston abutting against one end face of the large diameter piston; cylinder means supporting said piston means for reciprocating movement, said small diameter piston extending beyond said cylinder means so that the other end face thereof is subjected to atmospheric pressure; conduit means communicating with said cylinder means for applying to the other end face of said large diameter piston only the static pressure from said reduced portion of said conduit and to the one end face of said large diameter piston the total static pressure from one of the other portions of said conduit so that said piston means tends to move under the difference of forces acting on said acting faces in one direction, said piston means responding only to the differential between said static pressures; spring means operatively connected to said piston means and tending to move the same in a direction opposite to said one direction; and motion transmitting means connecting said piston means to a controlling member for moving the latter.

References Cited in the file of this patent

UNITED STATES PATENTS

| 1,673,041 | Connet | June 12, 1928 |
| 1,679,215 | Goldkamp | July 31, 1928 |
| 1,887,322 | Nettleton | Nov. 8, 1932 |
| 1,981,576 | Woolfenden | Nov. 20, 1934 |
| 2,016,613 | Pescara | Oct. 8, 1935 |
| 2,488,221 | Moore | Nov. 15, 1949 |
| 2,645,240 | Drake | July 14, 1953 |
| 2,653,753 | Davey | Sept. 29, 1953 |
| 2,725,068 | Howe | Nov. 29, 1955 |
| 2,830,616 | Tatum | Apr. 15, 1958 |
| 2,864,393 | Drake | Dec. 16, 1958 |
| 2,886,968 | Johnson et al. | May 19, 1959 |
| 2,914,239 | Wagenseil | Nov. 24, 1959 |

FOREIGN PATENTS

| 608,556 | Great Britain | Sept. 16, 1948 |
| 939,963 | Germany | Mar. 8, 1956 |
| 788,618 | Great Britain | Jan. 2, 1958 |